(12) United States Patent
Hitzler et al.

(10) Patent No.: US 9,403,976 B2
(45) Date of Patent: Aug. 2, 2016

(54) SEMICARBAZONES AS ACCELERATORS FOR CURING EPOXY RESINS

(75) Inventors: Martin Hitzler, Gottmadingen (DE); Monika Brandl, Tacherting (DE); Ansgar Gruber, Trostberg (DE)

(73) Assignee: ALZCHEM AG, Trostberg (DE)

( * ) Notice: Subject to any disclaimer, the term of this patent is extended or adjusted under 35 U.S.C. 154(b) by 627 days.

(21) Appl. No.: 13/643,119

(22) PCT Filed: May 18, 2011

(86) PCT No.: PCT/EP2011/058042
§ 371 (c)(1),
(2), (4) Date: Oct. 24, 2012

(87) PCT Pub. No.: WO2011/144659
PCT Pub. Date: Nov. 24, 2011

(65) Prior Publication Data
US 2013/0079488 A1    Mar. 28, 2013

(30) Foreign Application Priority Data

May 18, 2010    (DE) .......................... 10 2010 020 882

(51) Int. Cl.
| | | |
|---|---|---|
| C08L 63/00 | (2006.01) | |
| C08L 61/20 | (2006.01) | |
| C08G 59/40 | (2006.01) | |
| C08G 59/44 | (2006.01) | |
| C08G 59/46 | (2006.01) | |
| C08G 12/14 | (2006.01) | |

(52) U.S. Cl.
CPC ............. C08L 63/00 (2013.01); C08G 59/4014 (2013.01); C08G 59/4021 (2013.01)

(58) Field of Classification Search
CPC . C08G 59/4014; C08G 59/4021; C08L 63/00
USPC ............................................. 528/93; 564/36
See application file for complete search history.

(56) References Cited

U.S. PATENT DOCUMENTS

| | | |
|---|---|---|
| 2,993,044 A | 7/1961 | Applegath et al. |
| 3,274,231 A | 9/1966 | Kobayashi |
| 3,386,955 A | 6/1968 | Nawakowski et al. |
| 3,386,956 A | 6/1968 | Nawakowski et al. |
| 3,454,669 A | 7/1969 | Laudise |
| 3,717,612 A | 2/1973 | Babayan |
| 3,753,680 A | 8/1973 | Tilles |
| 3,789,071 A | 1/1974 | Babayan |
| 3,885,042 A | 5/1975 | Mulder |
| 4,283,520 A | 8/1981 | Moser et al. |
| 4,360,649 A | 11/1982 | Kamio et al. |
| 4,410,457 A | 10/1983 | Fujimura et al. |
| 5,043,102 A | 8/1991 | Chen et al. |
| 5,214,098 A | 5/1993 | Setiabudi et al. |
| 7,750,107 B2 | 7/2010 | Antelmann et al. |
| 2002/0007022 A1 | 1/2002 | Oosedo et al. |
| 2007/0027274 A1 | 2/2007 | Antelmann et al. |
| 2011/0027695 A1 | 2/2011 | Shimizu et al. |
| 2014/0308863 A1 | 10/2014 | Brandl et al. |
| 2014/0357762 A1 | 12/2014 | Eichhorn et al. |
| 2016/0083575 A1 | 3/2016 | Hitzler et al. |

FOREIGN PATENT DOCUMENTS

| | | |
|---|---|---|
| CN | 101709195 A | 5/2010 |
| DE | 01720200 | 6/1971 |
| DE | 2304789 | 8/1973 |
| DE | 2236339 | 2/1974 |
| DE | 3217723 | 12/1982 |
| DE | 10324486 | 12/2004 |
| DE | 102010020882 A1 | 11/2011 |
| EP | 298742 A2 | 1/1989 |
| EP | 429395 A2 | 5/1991 |
| EP | 0462456 | 12/1991 |
| EP | 603131 A1 | 6/1994 |
| EP | 2295483 A1 | 3/2011 |
| EP | 2306570 A1 | 4/2011 |
| FR | 1570670 A | 6/1969 |
| GB | 1153639 A | 5/1969 |
| GB | 2300187 A | 10/1996 |
| JP | 60011458 | 1/1985 |
| JP | 2003039505 A | 2/2003 |
| JP | 2004256729 A | 9/2004 |
| JP | 2006152170 A | 6/2006 |

(Continued)

OTHER PUBLICATIONS

Adams et al., "Do Deprotanated Semicarbazones Undergo the Negative-ion Beckmann Rearrangement in the Gas Phase?", Rapid Communications in Mass Spectrometry, vol. 4, No. 8, 1990, pp. 275-276.*

(Continued)

*Primary Examiner* — Randy Gulakowski

*Assistant Examiner* — Ha S Nguyen

(74) *Attorney, Agent, or Firm* — Kilpatrick Townsend & Stockton LLP

(57) ABSTRACT

The present invention describes the use in epoxy resin compositions of semicarbazones of the general formula (I) having the meanings stated for the residues $R^1$, $R^2$, $R^3$ and $R^4$.

Formula (I)

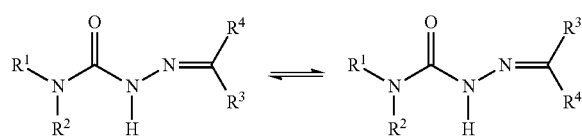

These semicarbazones exhibit elevated latency in epoxy resin compositions and are thus outstandingly suitable as latent curing accelerators for single-component epoxy resin compositions.

24 Claims, No Drawings

(56) References Cited

FOREIGN PATENT DOCUMENTS

| JP | 2008204895 A | | 9/2008 |
|---|---|---|---|
| SU | 1502585 A1 | | 8/1989 |
| SU | 1574618 A1 | * | 6/1990 |
| WO | 9527761 A1 | | 10/1995 |
| WO | 2004106402 A2 | | 12/2004 |
| WO | 2007062853 A1 | | 6/2007 |
| WO | 2011144659 A1 | | 11/2011 |

OTHER PUBLICATIONS

Hadzi et al. "The NH stretching band and the molecular configuration of acyl hydrazones and semicarbazones," Spectrochimica Acta Part A: Molecular Spectroscopy, (1967), vol. 23, Issue 3, pp. 571-577.*

Pandeya et al., "Synthesis and Biological Activity of Substituted Aryl Semicarbazones," Acta Ciencia Indica, Chemistry (2007), 33(1), pp. 85-92.*

Lee et al., "Handbook of Epoxy Resins," (1967), pp. 10-16.*

DE 102010020882.5, "German Search Report", May 18, 2010.

PCT/EP2011/058042, "International Search Report", Aug. 29, 2011.

Abendroth et al., "Structure-isomeric hydrazones", Angew.Chem, 1959, 71: 283.

Adams et al., "Do Deprotonated Semicarbazones Undergo the Negative-ion Beckmann Rearrangement in the Gas Phase?", Rapid Communications in Mass Spectrometry, 1990, vol. 4, No. 8, 275-276.

Chandra et al., "Manganese(II) Complexes of Cyclohexanone Semicarbazone and Cyclohexanone Thiosemicarbazone", Gazetta Chimica Italiana, 1980, 110: 207=210.

Chanley et al., "Long-cain Aliphatic Semicarbazides", J. Am. Chem. Soc., 1953, 75:5113-5114.

Hadzi et al., "The NH stretching band and the molecular configuration of acyl hydrazones and semicarbazones", Spectrochimica Acta, 1967, vol. 23A, pp. 571-577.

Naves et al., "Sur les spectres d'absorption infrarouge, entre 2,5 et 16, de semicarbazones", Helv. Chim. Acta, 1967, 50: 1461-1468—No translation available.

Pandeya et al., "Synthesis and Biological Activity of Substituted Aryl Semicarbazones", Acta Ciencia Indica, 2007, vol. XXXII C; No. 1; 85.

HCAPLUS accesion No. 2010:633650, Derwent accession No. 2010-F96374, 6 pages.

U.S. Appl. No. 14/357,030, "Non-Final Office Action", Oct. 16, 2015, 12 pages.

U.S. Appl. No. 14/357,030, "Final Office Action", Mar. 16, 2016, 12 pages.

U.S. Appl. No. 14/954,560, "Non-Final Office Action", Jan. 15, 2016, 13 pages.

German Patent Application No. DE102011118501.5, "German Search Report dated Sep. 20, 2012", 3 pages (No translation available).

German Patent Application No. DE102011118760.0, "German Search Report", Aug. 14, 2012, 2 pages (No translation available).

International Patent Application No. PCT/EP2012/072588, International Preliminary Report on Patentability dated May 30, 2014.

International Patent Application No. PCT/EP2012/072588, International Search Report dated Jul. 5, 2013.

International Patent Application No. PCT/EP2012/072593, International Search Report dated Feb. 18, 2013.

U.S. Appl. No. 14/357,049, "Non-Final Office Action", May 9, 2016, 32 pages.

* cited by examiner

SEMICARBAZONES AS ACCELERATORS FOR CURING EPOXY RESINS

PRIOR RELATED APPLICATIONS

This application is a National Phase application of International Application No. PCT/EP2011/058042 filed May 18, 2011, which claims priority to DE 102010020882.5 filed May 18, 2010, each of which is incorporated herein by reference in its entirety.

The present invention provides the use of semicarbazones as latent accelerators for curing epoxy resin compositions by means of heat-activatable curing agents such as for example amines, amides, guanidines, biguanides, carboxylic anhydrides or polyphenols.

For Curing Epoxy Resins

Thermosetting epoxy resins are very widely used due to their good chemical resistance, their very good thermal and dynamic mechanical properties and their elevated dielectric strength. They moreover exhibit good adhesion to many substrates. Due to these properties they preferably serve as a low-shrinkage matrix for fibre-reinforced composites which are used as structural elements which are simultaneously of a low weight. Epoxy resins are furthermore often found as constituents of casting resins, electrical laminates, structural adhesives, powder coatings and encapsulation compounds (cf. G. W. Ehrenstein, Faserverbund-Kunststoffe [fibre composite plastics], 2006, 2nd edition, Carl Hanser Verlag, Munich, pages 63-68; and M. Reyne, Composite Solutions, 2006, JEC Publications, pages 31-37).

Epoxy resins cure by various mechanisms. In addition to curing with polyphenols or carboxylic anhydrides, curing is frequently carried out with amines or amides. This is achieved by adding the stoichiometric quantity of hydrogen atoms, as are for example supplied by difunctional amines or amides. Reference is made in this connection to chapter 2 "Curing agents for epoxy resins" in "Chemistry and Technology of Epoxy Resins" by Bryan Ellis, published in 1993 by Blackie Academic & Professional. It is described herein that crosslinking is often carried out by means of aromatic, aliphatic, araliphatic or cycloaliphatic amines, polyamides, polyamidoamines, polyetheramines, Mannich bases, anhydrides or polyphenols (phenol novolaks). Due to their usually elevated reactivity and thus short pot life, such epoxy resin-curing agent compositions are frequently formulated in two components. This means that the resin (A component) and curing agent (B component) are stored separately and only mixed together in the correct ratio just before being used. "Latent" here means that, under defined storage conditions and for defined storage periods, a mixture of the individual components is stable and does not cure rapidly until it has been activated, generally thermally (H. Sanftenberg, M. Fedke *Angew. Makrom. Chem.* 1995, 225, 99-107).

In contrast, single-component, hot-curing mixtures are preformulated in a ready-to-use form, so ruling out errors in mixing of the individual components in on-site use. A prerequisite for this purpose are latent curing agent systems which are stable (storable) at room temperature, but readily react to completion when heated. Dicyandiamide (DICY) is, for example, a particularly suitable and also inexpensive curing agent for such single-component epoxy resin formulations. Corresponding resin-curing agent mixtures may be stored under ambient conditions for up to six (6) months while remaining usable. This property is above all due to the insolubility of DICY in epoxy resins at ambient temperature (Bryan Ellis, *Chemistry and Technology of Epoxy Resins*, 1993, Blackie Academic & Professional, page 49). However, due to the pronounced chemical inertness of DICY, such systems require long curing times at elevated temperature (R. Lopez, 1966, U.S. Pat. No. 3,391,113; G. Ott, 1949, U.S. Pat. No. 2,637,715 B1; J. v. Seyerl, 1984, EP 0 148 365). Accelerators may be used in combination with the dicyandiamide curing agent in order to reduce curing temperatures. Compounds which exhibit these properties are inter alia urons (Th. Güthner, B. Hammer *J. Appl. Polym. Sci.*, 1993, 50, 1453-1459; Brockmann et al. *J. Adhesion & Adhesives*, 2000, 20, 333-340; Poisson et al. *J. Appl. Polym. Sci.*, 1998, 69, 2487-2497) or imidazoles (GB 1 050 679; Ricciardi et al. *J. Appl. Polym. Sci.*, 1983, 21, 1475-1490). While extraordinarily long latency times are described for uron systems, imidazole resin formulations with or without dicyandiamide generally have a short pot life of just a few hours (Bryan Ellis, *Chemistry and Technology of Epoxy Resins*, 1993, Blackie Academic & Professional, pages 58-60). Examples of the use of urons in storage-stable, latent-curing single-component epoxy resin compositions are described in patent documents U.S. Pat. No. 3,562,215, U.S. Pat. No. 3,956,237, GB 1,153, 639 A1, GB 1,293,142 A1, U.S. Pat. No. 3,386,956, U.S. Pat. No. 6,231,959 and DE 103 24 486 A1. Urons are, however, for the most part solids with low solubility in conventional organic solvents or water. Moreover, many currently commercially obtainable products contain substituted aromatics which in turn often bear the halogens chlorine or fluorine. Examples include monuron, diuron, chlorotoluron or flumeturon. These products, which have for the most part long been known, are now considered questionable both toxicologically and with regard to occupational safety.

The object of the present work was accordingly to provide latent accelerators for the production of storage-stable, latent-curing single-component epoxy resin compositions which no longer exhibit the disadvantages of the described prior art. It surprisingly proved possible to achieve the stated object by using class of substances, semicarbazones, which are described below.

It has now been found that semicarbazones according to formula (I) are particularly well suited to being curing accelerators for epoxy resin compositions, in particular for epoxy resin compositions which comprise one or more heat-activatable curing agents, the semicarbazones being of the following structure:

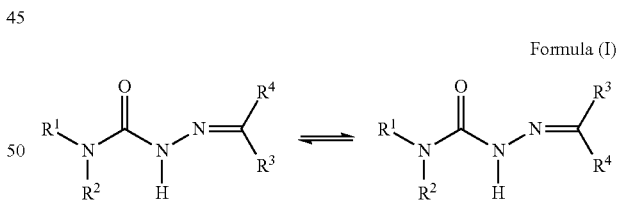

Formula (I)

wherein $R^1$=branched or linear alkyl residue, cycloalkyl residue, aryl residue or alkylaryl residue, $R^2$=H, branched or linear alkyl residue, cycloalkyl residue, aryl residue or alkylaryl, $R^3$, $R^4$=simultaneously or mutually independently H, branched or linear alkyl residue, cycloalkyl residue, alkylaryl residue, aryl residue, heteroaryl residue or CN;

or $R^1$=branched or linear alkyl residue, cycloalkyl residue, aryl residue or alkylaryl residue, $R^2$=H, branched or linear alkyl residue, cycloalkyl residue, aryl residue or alkylaryl residue, $R^3$ and $R^4$=alkylene with —$(CH_2)_n$— and $2 \leq n \leq 11$.

Particularly preferred semicarbazones in this connection are those which comprise the following substituents $R^1$ to $R^4$:
$R^1$=methyl, ethyl, benzyl or phenyl,
$R^2$=H, methyl, ethyl, benzyl or phenyl,
$R^3$, $R^4$=simultaneously or mutually independently H, methyl, ethyl, propyl, isopropyl, butyl, isobutyl, benzyl or phenyl, or
$R^1$=methyl, ethyl, benzyl or phenyl,
$R^2$=H, methyl, ethyl, benzyl or phenyl,
$R^3$ and $R^4$=alkylene with —$(CH_2)_n$— and 2≤n≤6.

These semicarbazones exhibit elevated latency in single-component epoxy resin compositions.

According to the invention, the semicarbazones are used as curing accelerators, and not as the curing agents themselves. This means that addition of the semicarbazones accelerates the curing effected by a heat-activatable curing agent. This acceleration is in particular latent, i.e. the accelerating action of the semicarbazones does not come into effect until activation, in particular thermal activation, has occurred.

Semicarbazides and Semicarbazones

Semicarbazones of the general formula (I) are a class of substances which have hitherto only infrequently been described in the literature.

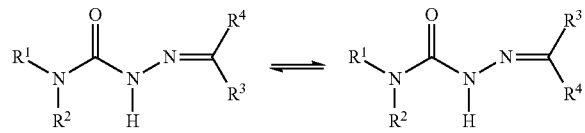

Formula (I)

Adams and Bowie (*Rapid Communications in Mass Spectrometry*, 1990, 4(8), 275-6) investigated impact-induced fragmentation of acetone 4,4-dimethylsemicarbazone ($R^1$=$R^2$=$R^3$=$R^4$=Me) and acetophenone 4,4-dimethylsemicarbazone ($R^1$=$R^2$=$R^3$=Me, $R^4$=Ph) in a mass spectrometer. Hadzi and Jan (*J. Spectrochimica Acta, Part A: Molecular and Biomolecular Spectroscopy*, 1967, 23(3), 571-7) addressed the question of molecular configuration using the 4,4-diethyl derivatives by way of example ($R^1$=$R^2$=Et, $R^3$=$R^4$=Me and $R^1$=$R^2$=Et, $R^3$=Me, $R^4$=Ph). Some carbocyclically and heterocyclically substituted semicarbazones have been investigated for possible pharmaceutical applications, for example by CoCENSYS INC. (WO 98/47869) or by the University of Vienna (*J. Inorg. Chem.* 2007, 101(11-12), 1946-1957). Other publications describe a pesticidal (U.S. Pat. No. 4,344,893 A) or also growth-regulating action (*Biologizace a Chemizace Vyzivy Zvirat* 1977, 13(4), 357-74). Glöckler 1994 furthermore published an article (Zur Chemie der 1,3,4-Oxadiazoliumsalze [on the chemistry of 1,3,4-oxadiazolium salts], Wissenschaftliche Arbeit im Fach Chemie an der Universität Konstanz [scientific work in the chemistry department at the University of Konstanz], June 1994), reporting a detailed study into the production and characterisation of some 4,4-dimethylsemicarbazones (I) starting from 4,4-dimethyl-semicarbazide (II). This mentioned, for example, the dicyclopropyl ketone, cyclopropyl phenyl ketone, acetophenone, acetone, benzophenone or cyclopentanone 4,4-dimethylsemicarbazone derivatives.

4,4-Dimethylsemicarbazide (II) and 4,4-diethylsemicarbazide (III) may be obtained synthetically using methods known from the literature, as for example published in C. Vogelesang (*Rec. Tray. Chim.* 1943, 62, 5) or in WO 98/47869.

Further semicarbazides may be obtained in similar manner by reacting hydrazine with corresponding carbamoyl chlorides. The resultant semicarbazides may be converted in a subsequent stage into the desired semicarbazones according to formula (I) by reaction with corresponding ketones (cf. also Glöckler (Zur Chemie der 1,3,4-Oxadiazoliumsalze [on the chemistry of 1,3,4-oxadiazolium salts], Wissenschaftliche Arbeit im Fach Chemie an der Universität Konstanz [scientific work in the chemistry department at the University of Konstanz], June 1994)).

The literature makes no mention of the semicarbazones of the composition (I) as a curing agent or accelerator for crosslinking epoxy resins.

It has surprisingly furthermore been found that the compounds of formula (I) according to the invention, preferably in combination with heat-activatable curing agents such as for example amines, amides, guanidines, biguanides, carboxylic anhydrides or polyphenols, are outstandingly suitable as curing accelerators for curing epoxy resin compositions. According to the present invention, semicarbazones of the general formula (I) are accordingly used for this purpose,

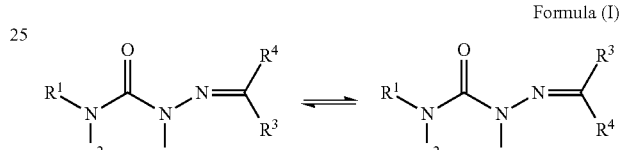

Formula (I)

wherein
$R^1$=branched or linear alkyl residue, cycloalkyl residue, aryl residue or alkylaryl residue,
$R^2$=H, branched or linear alkyl residue, cycloalkyl residue, aryl residue or alkylaryl,
$R^3$, $R^4$=simultaneously or mutually independently H, branched or linear alkyl residue, cycloalkyl residue, alkylaryl residue, aryl residue, heteroaryl residue or CN;
or
$R^1$=branched or linear alkyl residue, cycloalkyl residue, aryl residue or alkylaryl residue,
$R^2$=H, branched or linear alkyl residue, cycloalkyl residue, aryl residue or alkylaryl residue,
$R^3$ and $R^4$=alkylene with —$(CH_2)_n$— and 2≤n≤11.

Particularly preferred semicarbazones in this connection are those which comprise the following substituents $R^1$ to $R^4$:
$R^1$=methyl, ethyl, benzyl or phenyl,
$R^2$=H, methyl, ethyl, benzyl or phenyl,
$R^3$, $R^4$=simultaneously or mutually independently H, methyl, ethyl, propyl, isopropyl, butyl, isobutyl, benzyl or phenyl, or
$R^1$=methyl, ethyl, benzyl or phenyl,
$R^2$=H, methyl, ethyl, benzyl or phenyl,
$R^3$ and $R^4$=alkylene with —$(CH_2)_n$— and 2≤n≤6.

Substituents $R^1$ to $R^4$ may be widely varied. Methyl, ethyl and benzyl are furthermore preferred residues $R^1$ and $R^2$. The substitution pattern for $R^3$ and $R^4$ is determined by the aldehyde or ketone used in the synthesis (G. W. Adams, J. H. Bowie *Rapid Communications in Mass Spectrometry*, 1990, 4(8), 275-6; D. J. Hadzi *J. Spectrochimica Acta* (A) 1967, 23(3), 571-7; St. Glöckler, [on the chemistry of 1,3,4-oxadiazolium salts], Wissenschaftliche Arbeit im Fach Chemie an der Universität Konstanz [scientific work in the chemistry department at the University of Konstanz], June 1994). In particular, acetaldehyde, benzaldehyde, salicylaldehyde, cinnamaldehyde, anisaldehyde, acetone, methyl ethyl ketone, methyl propyl ketone, methyl isobutyl ketone, cyclopentanone, cyclohexanone, diethyl ketone, dicyclopropyl ketone, cyclopropyl phenyl ketone, acetophenone, benzophenone, 3-indolyl methyl ketone, phenyl 2-pyridyl ketone, methyl 2-pyridyl ketone or 1-cyano-2,2-dimethylpropanone are used.

Semicarbazones in which $R^1$ represents methyl, ethyl, benzyl or phenyl are preferred according to the invention. Semicarbazones in which $R^2$ represents H, methyl, ethyl, benzyl or phenyl, in particular methyl, ethyl, benzyl or phenyl, are furthermore preferred according to the invention.

Semicarbazones in which $R^3$ and $R^4$ mutually independently represent H, $C_1$-$C_4$ alkyl, benzyl or phenyl or $R_3$ and $R_4$ together form an alkylene with —$(CH2)_n$—, in which $2 \leq n \leq 6$, are furthermore preferred.

Structurally, the semicarbazones (I) may assume the form not only of geometric isomers ((Z), (E) isomers) but alternatively of the respective tautomeric forms (keto-enol tautomers). Depending on the residues R' to $R^4$, the compounds (I) are obtained in solid, semisolid or in liquid-oily form. The substitution pattern also determines the solubility of the semicarbazones (I) in solvents or in epoxy resins.

By way of example and without limitation on the semicarbazones of the general formula (I) according to the invention, preferred representatives which are used are acetone 4,4-dimethylsemicarbazone (Ac DMS), methyl ethyl ketone 4,4-dimethylsemicarbazone (MEK DMS), dicyclopropyl ketone 4,4-di-methylsemicarbazone (DCyPr DMS), methyl isobutyl ketone 4,4-dimethyl-semicarbazone (MIBK DMS), cyclopentanone 4,4-dimethylsemicarbazone (CyPn DMS), cyclohexanone 4,4-dimethylsemicarbazone (CyHx DMS), acetophenone 4,4-dimethylsemicarbazone (AcPh DMS), cyclopropyl phenyl ketone 4,4-dimethylsemicarbazone (CyPrPh DMS), benzophenone 4,4-di-methylsemicarbazone (BzPh DMS), acetone 4,4-diethylsemicarbazone (Ac DES), cyclopentanone 4,4-diethylsemicarbazone (CyPn DES) or acetophenone 4,4-diethylsemicarbazone (AcPh DES).

In particular, dicyandiamide may be used as a heat-activatable curing agent.

A further aspect of the present invention provides that the semicarbazone or mixtures of semicarbazones be used in a quantity of 0.1 to 15 wt. % relative to the epoxy resin composition, preferably in a quantity of 1 to 10 wt. %. Alternatively or in addition, however, it may also be provided that the semicarbazone or mixtures of semicarbazones be used in a ratio of 0.1 to 15 parts relative to 100 parts of epoxy resin.

The present invention is not subject to any restriction with regard to the epoxy resins to be cured. Consideration may in particular be given to any conventional commercial products which conventionally comprise more than one 1,2-epoxy group and may here be saturated or unsaturated, aliphatic, cycloaliphatic, aromatic or heterocyclic. The epoxy resins may moreover comprise substituents such as halogens, phosphorus and hydroxyl groups. Epoxy resins based on glycidyl polyethers of 2,2-bis(4-hydroxyphenyl)propane (bisphenol A) and the bromine-substituted derivative (tetrabromo-bisphenol A), glycidyl polyethers of 2,2-bis(4-hydroxyphenyl)methane (bisphenol F) and glycidyl polyethers of novolak resins and based on aniline or substituted anilines such as for example p-aminophenol or 4,4'-diaminodiphenylmethane may be particularly effectively cured by using the compounds according to the invention of the formula (I) in the presence of heat-activatable curing agents.

According to a further aspect, the present invention accordingly likewise provides an epoxy resin composition. This epoxy resin composition comprises a) an epoxy resin with at least one reactive epoxy group,
b) at least one heat-activatable curing agent
c) at least one semicarbazone of the general formula (I) as curing accelerator,

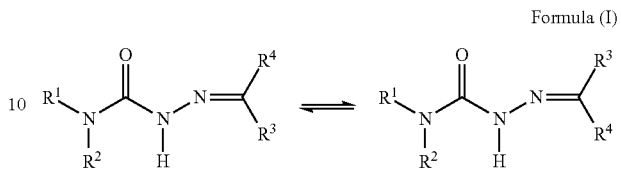

Formula (I)

in which
$R^1$=branched or linear alkyl residue, cycloalkyl residue, aryl residue or alkylaryl residue,
$R^2$=H, branched or linear alkyl residue, cycloalkyl residue, aryl residue or alkylaryl,
$R^3$, $R^4$=simultaneously or mutually independently H, branched or linear alkyl residue, cycloalkyl residue, alkylaryl residue, aryl residue, heteroaryl residue or CN;
or
$R^1$=branched or linear alkyl residue, cycloalkyl residue, aryl residue or alkylaryl residue,
$R^2$=H, branched or linear alkyl residue, cycloalkyl residue, aryl residue or alkylaryl residue,
$R^3$ and $R^4$=alkylene with —$(CH_2)_n$— and $2 \leq n \leq 11$.

Particularly preferred epoxy resin compositions are here those which comprise a semicarbazone of the general formula (I) with following substituents $R^1$ to $R^4$:
$R^1$=methyl, ethyl, benzyl or phenyl,
$R^2$=H, methyl, ethyl, benzyl or phenyl,
$R^3$, $R^4$=simultaneously or mutually independently H, methyl, ethyl, propyl, isopropyl, butyl, isobutyl, benzyl or phenyl,
or
$R^1$=methyl, ethyl, benzyl or phenyl,
$R^2$=H, methyl, ethyl, benzyl or phenyl,
$R^3$ and $R^4$=alkylene with —$(CH_2)_n$— and $2 \leq n \leq 6$.

A preferred embodiment of the present invention provides that amines, amides, guanidines, biguanides, carboxylic anhydrides or polyphenols be used as heat-activatable curing agents.

Preferred examples of heat-activatable curing agents used according to the invention which may be mentioned in non-limiting manner are not only biguanides such as for example ortho-tolylbiguanide (OTB), methylenedianiline (MDA, DDM) but also the saturated form of para-aminocyclohexylmethane (PACM) or derivatives of these amines, 3,3'- or 4,4'-diaminodiphenyl sulfone (DDS) or mixtures thereof, polyetheramines (Jeffamines), dicyandiamide (DCD), dihydrazides of adipic or sebacic acid, anhydrides of pyromellitic, trimellitic or phthalic acid, the derivatives thereof, which may also be hydrogenated or partially hydrogenated, phenol novolaks or cresol novolaks.

The epoxy resin compositions are prepared for the purposes of the invention on the basis of principles known to a person skilled in the art. To this end, in a first step, the resin and curing agent are homogeneously mixed together. The curing agent here preferably constitutes the crosslinking component and is thus introduced in the required stoichiometric quantity. The input quantity is for the most part directly dependent on the molecular weight of the curing agent compound and thus also on the specific HEW (Hydrogen Equivalent Weight) value. This may either be obtained from the manufacturer's data sheet or be obtained as the quotient resulting from dividing the molecular weight of the curing agent by the number of reactive H functions. For stoichiometric curing of 100 parts of epoxy resin, the quotient of the HEW (curing agent) and the EEW (resin) is calculated and multiplied by 100. The EEW (epoxy equivalent weight) value of the resin is obtained from the manufacturer's data sheet.

In a second step, the accelerators (I) according to the invention are added, wherein the order in which the mixture of resin, curing agent, accelerator and optional further additives is prepared is not mandatory for the effect of the invention. The auxiliary substances used likewise do not limit the performance of the invention. Dissolvers or kneaders are for example preferred methods for homogeneously blending the components.

No limits apply with regard to the quantity of accelerators (I) used according to the invention. Preferably, 0.01 to 20 parts, preferably 0.1 to 15 parts, preferably 0.1 to 10 parts and particularly preferably 1 to 5 parts of accelerator are used per 100 parts of resin. The present invention also includes a combination of a plurality of accelerators.

Curing of the epoxy resins with the assistance of the compounds (I) used according to the invention generally proceeds at temperatures of 60 to 200° C. preferably of 80 to 180° C. and in particular at 100 to 160° C. Selection of the curing temperature depends on specific processing and product requirements and may above all be varied by means of the formulation by adjusting the quantities of curing agent and by adding additives. The manner in which energy is supplied to the resin formulations is here immaterial. By way of example, energy may be supplied in the form of heat by a furnace or heating elements, but likewise by means of infrared lamps or excitation by microwaves or other kinds of radiation.

The curing profile of the formulations according to the invention may be varied by the addition of further conventional commercial additives, as are familiar to a person skilled in the art for curing epoxy resins. Initiation temperatures may thus, for example, be further reduced as a function of the added quantity or alternatively the gel times and hence curing times may advantageously be adapted to technical specifications and thus to specific customer requirements.

Additives for improving the processability of the uncured epoxy resin compositions or for adapting the thermomechanical properties of the thermosetting products to the requirements profile comprise for example reactive diluents, fillers, rheological additives such as thixotroping agents or dispersion additives, anticaking agents, dyes, pigments, impact modifiers or flameproofing additives.

No restrictions apply either with regard to physical form whether it be of the resins or the curing agents, accelerators or further additives. In particular, pulverulent components may be used in micronised or alternatively in crystalline form. The addition of solvents may be advantageous in many applications. Examples of solvents are water, various esters of glycol ethers, as well as ketones such as acetone, MEK, MIBK or solvents such as DMF, etc. These serve either to depress viscosity or to provide dissolved formulations. Both are highly advantageous when impregnating reinforcing fibres, as are used in the production of fibre composite materials. One particularly preferred variant is accordingly to use semicarbazones (I) which are liquid or soluble in the resin formulation.

Thanks to the favourable application characteristics of the accelerators according to the invention and the inexpensive production thereof and a concomitant advantageous cost/benefit ratio, they are particularly well suited to industrial application.

The present invention describes the use in epoxy resin compositions of semicarbazones of the general formula (I) having the meanings stated for the residues $R^1$, $R^2$, $R^3$ and $R^4$.

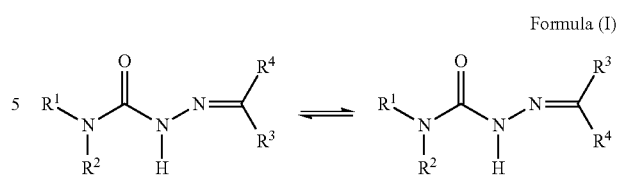

Formula (I)

These semicarbazones exhibit elevated latency in epoxy resin compositions and are thus outstandingly suitable as latent curing accelerators for single-component epoxy resin compositions.

The following examples illustrate the advantages of the present invention.

EXAMPLES

The following resin, curing agent and accelerator components were used in the examples to illustrate the invention:

Epoxy Resin:

| Name | Short name | EEW | CAS no. |
|---|---|---|---|
| Bisphenol A liquid resin[1)] | Epikote 828 | 182-187 average molecular weight <=700 | [25068-38-6] |

Curing Agent:

| Name | Short name | HEW | CAS no. |
|---|---|---|---|
| Dicyandiamide (cyanoguanidine)[2)] | DCD (DICY) | 12-14 | [461-58-5] |

Accelerator (Comparison):

| Name | Short name | CAS no. |
|---|---|---|
| Dyhard ® UR500 (TDI-uron)[2)] | UR500 | [26604-41-1] |
| Dyhard ® PI-FF (2-phenylimidazole)[2)] | PI-FF | [670-96-2] |

General Production of Semicarbazones According to Formula (I)

a) Synthesis of semicarbazides 4,4-Dimethylsemicarbazide (II) and 4,4-diethylsemicarbazide (III) may be obtained synthetically using methods known from the literature, as for example published in C. Vogelesang (Rec. Tray. Chim. 1943, 62, 5) or in WO 98/47869. By way of example, Example 26 of patent WO 98/47869 explains that 4,4-dimethylsemicarbazide (II) is produced by dropwise reaction of equimolar quantities of hydrazine hydrate and dimethylcarbamoyl chloride in the solvents ethanol and diethyl ether with ice bath cooling and 1 hour's post-reaction with ice bath cooling. After filtration of the precipitated solid, concentration of the reaction mixture gives rise to the target compound (II) as a white, crystalline solid.

b) Synthesis of semicarbazones

The semicarbazides produced according to a) are then reacted with ketones to yield the desired semicarbazones.

Again taken by way of example, the reaction of semicarbazides (II) to yield semicarbazones (I) according to the invention is illustrated using cyclopentanone 4,4-dimethylsemicarbazone ($R^1=R^2=$Me; $R^3$ and $R^4=-(CH_2)_4-$) as an example. According to Glöckler (Zur Chemie der 1,3,4-Oxadiazoliumsalze [on the chemistry of 1,3,4-oxadiazolium salts], Wissenschaftliche Arbeit im Fach Chemie an der Universität Konstanz [scientific work in the chemistry department at the University of Konstanz], June 1994), cyclopentanone is reacted to this end in a 5-fold excess with the semicarbazide (II) in boiling ethanol. After 45 min, the reaction is complete and, once the solvent and excess ketone have evaporated, a colourless to pale yellowish powder is obtained by stirring the residue under ice-cold pentane. Structure and composition were confirmed by IR and NMR ($^1$H, $^{13}$C) spectroscopic investigations and by CHN analysis.

The Above Semicarbazones Stated Herein are Produced in a Similar Manner.

Accelerator (According to the Invention):

lain mortar and homogeneously intermixing them by hand. Solids were triturated beforehand in a mortar.

Determination of Gel Time

Approx. 700-800 mg of freshly prepared sample were weighed out into a small aluminium cup which was placed in a heating block preheated to the stated temperature (start of timing). Gelation testing was carried out with a wooden cocktail stick which was dipped into the liquid resin. When a stable filament was obtained on withdrawal (no dripping any longer), this time was defined as the gel time.

Performance of dynamic DSC measurements

The sample was heated from 30 to 250° C. at a heating rate of 10 K/min in order to determine the DSC peak temperature

| Name | | | Short name | CAS no. |
|---|---|---|---|---|
| Acetone 4,4-dimethylsemicarbazone[4,6] | | | Ac DMS | [130652-43-6] |
| $C_6H_{13}N_3O$ (143.19) | Calc. | C 50.33% | H 9.15% | N 29.35% |
| | Found | C 48.97% | H 9.02% | N 28.47% |
| Methyl ethyl ketone 4,4-dimethylsemicarbazone | | | MEK DMS | [no CAS no.] |
| $C_7H_{15}N_3O$ (157.21) | Calc. | C 53.48% | H 9.62% | N 26.73% |
| | Found | C 53.88% | H 9.70% | N 25.48% |
| Methyl isobutyl ketone 4,4-dimethylsemicarbazone | | | MIBK DMS | [no CAS no.] |
| $C_9H_{19}N_3O$ (185.27) | Calc. | C 58.35% | H 10.34% | N 22.68% |
| | Found | C 57.71% | H 10.76% | N 22.30% |
| Cyclopentanone 4,4-dimethylsemicarbazone[6] | | | CyPn DMS | [no CAS no.] |
| $C_8H_{15}N_3O$ (169.22) | Calc. | C 56.78% | H 8.93% | N 24.83% |
| | Found | C 56.72% | H 8.96% | N 24.83% |
| Acetophenone 4,4-dimethylsemicarbazone[4,6] | | | AcPh DMS | [17106-64-8] |
| $C_{11}H_{15}N_3O$ (205.26) | Calc. | C 64.37% | H 7.37% | N 20.47% |
| | Found | C 64.18% | H 7.39% | N 19.71% |
| Cyclohexanone 4,4-dimethylsemicarbazone | | | CyHx DMS | [no CAS no.] |
| $C_9H_{17}N_3O$ (183.25) | Calc. | C 58.99% | H 9.35% | N 22.93% |
| | Found | C 58.21% | H 9.05% | N 23.22% |
| Acetone 4,4-diethylsemicarbazone[5] | | | Ac DES | [14850-53-4] |
| $C_8H_{17}N_3O$ (171.24) | Calc. | C 56.11% | H 10.01% | N 24.54% |
| | Found | C 55.68% | H 10.49% | N 24.33% |
| Acetophenone 4,4-diethylsemicarbazone[5] | | | AcPh DES | [14850-67-0] |
| $C_{13}H_{19}N_3O$ (233.31) | Calc. | C 66.92% | H 8.21% | N 18.01% |
| | Found | C 66.25% | H 8.08% | N 18.49% |

Production and Origin of Resin, Curing Agent and Accelerator:
1) Hexion Speciality Chemicals
2) AlzChem GmbH, Trostberg
3) Sigma-Aldrich Group (further substances required for synthesis)
4) G. W. Adams, J. H. Bowie, *Rapid Communications in Mass Spectrometry*, 1990, 4(8), 275-6.
5) D. J. Hadzi, *J. Spectrochimica Acta, Part A: Molecular and Biomolecular Spectroscopy*, 1967, 23(3), 571-7.
6) St. Glöckler, Zur Chemie der 1,3,4-Oxadiazoliumsalze [on the chemistry of 1,3,4-oxadiazolium salts], Wissenschaftliche Arbeit im Fach Chemie an der Universität Konstanz [scientific work in the chemistry department at the University of Konstanz], June 1994.

Production of the Sample

The resin/curing agent formulations were prepared by weighing out the components in the stated ratio into a porce- (DSC peak T). The DSC onset temperature (DSC onset T) was determined from the same measurement by applying the tangent to the exothermic reaction peak. The isothermal reaction time was determined by introducing a second sample into the DSC furnace by means of a sample injector and maintaining this temperature for at least 40 min. The location of the curing peak corresponded to the time of the maximum exothermic rate and was defined as the isothermal reaction time.

Measurement of Glass Transition Temperature by DSC (Final Tg)

The maximum achievable glass transition temperature (final Tg) was determined using the pregelled sample from the gel time determination. The sample was completely cured by heating to 200° C. (DSC temperature programme: 30 to 200° C., heating rate 20 K/min) and maintaining the temperature for 30 min. After cooling to 30° C., the sample was heated again from 30 to 200° C. at a heating rate of 10 K/min and the Tg determined from the heating curve by applying the tangent at the inflection point of greatest change in thermal capacity (ΔCp).

Method for Latency Experiment

Latency (storage stability) was determined by freshly preparing approx. 10 g of the sample and treating it at the stated temperature in a furnace. Progression of crosslinking (curing) of the epoxy resin compound was measured by determining the dyn. viscosity of a sample at 25° C. in a)cone(1°-plate rheometer at the respective measurement time.

The experiments were evaluated by plotting the percentage increase in viscosity (%) against time in hours (h) or days (d) and extrapolating the individual data by means of an exponential or potential mathematical function.

Analytical Instruments Used

| Gel time | Heating block | VLM 2.0 HT |
| DSC measurements | DSC calorimeter | Mettler-Toledo DSC 822 |
| Viscosity | Rheometer | Haake RheoStress 1 |

Example 1

Gel Time, Dyn. DSC and Final Tg

The resin formulations of the general composition
Epikote 828 (100 parts):DCD (6.5 parts):accelerator (x parts) were prepared and tested as described above in accordance with Tables 1a and 1b.

TABLE 1a

Gel time, dyn. DSC and final Tg (not according to the invention)

| Composition | Accelerator (parts) | Gel time at 120° C. [min:sec] | Gel time at 140° C. [min:sec] | DSC peak temperature [° C.] | Final Tg (DSC) [° C.] |
| --- | --- | --- | --- | --- | --- |
| 1.01 | UR500 (1.0 part) | 12:40 | 04:00 | 150.2 | 150 |
| 1.02 | UR500 (3.0 parts) | 07:30 | 02:45 | 143.4 | 134 |
| 1.03 | UR500 (5.0 parts) | 05:50 | 02:25 | 140.3 | 126 |
| 1.04 | PI-FF (1.0 part) | 06:40 | — | 143.5 | 165 |
| 1.05 | PI-FF (3.0 parts) | 03:05 | — | 130.7 | 154 |
| 1.06 | PI-FF (5.0 parts) | 02:30 | 01:10 | 125.9 | 124 |
| 1.07 | without accelerator | >180 | >60 | 199.6 | 167 |

TABLE 1b

Gel time, dyn. DSC and final Tg (according to the invention)

| Composition | Accelerator (parts) | Gel time at 120° C. [min:sec] | Gel time at 140° C. [min:sec] | DSC peak temperature [° C.] | Final Tg (DSC) [° C.] |
| --- | --- | --- | --- | --- | --- |
| 1.20 | Ac DMS (1.0 part) | 12:10 | 03:20 | 148.9 | 149 |
| 1.21 | Ac DMS (3.0 parts) | 05:05 | 02:20 | 137.9 | 130 |
| 1.22 | Ac DMS (5.0 parts) | 04:10 | 01:55 | 133.8 | 122 |
| 1.23 | MEK DMS (1.0 part) | 14:15 | 03:10 | 156.2 | 147 |
| 1.24 | MEK DMS (3.0 parts) | 05:55 | 02:45 | 140.2 | 132 |
| 1.25 | MEK DMS (5.0 parts) | 04:40 | 02:15 | 135.3 | 123 |
| 1.26 | MIBK DMS (1.0 part) | 17:50 | 05:10 | 152.0 | 151 |
| 1.27 | MIBK DMS (3.0 parts) | 06:55 | 03:00 | 142.2 | 132 |
| 1.28 | MIBK DMS (5.0 parts) | 05:35 | 02:40 | 139.0 | 123 |
| 1.29 | CyPn DMS (1.0 part) | 15:15 | 05:00 | 154.6 | 151 |
| 1.30 | CyPn DMS (3.0 parts) | 07:20 | 03:20 | 144.8 | 135 |
| 1.31 | CyPn DMS (5.0 parts) | 05:30 | 02:15 | 142.1 | 125 |
| 1.32 | CyHx DMS (1.0 part) | 16:00 | 04:25 | 157.3 | 145 |
| 1.33 | CyHx DMS (3.0 parts) | 08:20 | 03:25 | 151.7 | 136 |
| 1.34 | CyHx DMS (5.0 parts) | 06:40 | 02:50 | 145.0 | 125 |
| 1.35 | AcPh DMS (1.0 part) | 17:35 | 04:20 | 154.4 | 145 |
| 1.36 | AcPh DMS (3.0 parts) | 07:45 | 02:45 | 145.9 | 132 |
| 1.37 | AcPh DMS (5.0 parts) | 06:15 | 02:30 | 141.7 | 124 |
| 1.38 | Ac DES (1.0 part) | — | 18:40 | 184.2 | 153 |
| 1.39 | Ac DES (3.0 parts) | — | 11:10 | 171.2 | 139 |
| 1.40 | Ac DES (5.0 parts) | — | 08:00 | 167.6 | 124 |
| 1.41 | AcPh DES (1.0 part) | — | 21:15 | 185.9 | 144 |
| 1.42 | AcPh DES (3.0 parts) | — | 13:30 | 176.8 | 140 |
| 1.43 | AcPh DES (5.0 parts) | — | 12:00 | 172.4 | 128 |

The accelerating action of the semicarbazones (I) according to the invention in conjunction with the curing agent DCD is clear from Examples 1.20-1.43 in comparison with Example 1.07. In the absence of accelerator, the inert curing agent DCD does not act in the above-described epoxy resin matrix until a temperature of 199.6° C. is reached (cf. Example 1.07). At this temperature, the exothermic reaction peak revealed by the DSC experiment indicates polymerisation to form the thermosetting network. If the accelerator (I) according to the invention is added to the epoxy resin-curing agent mixture, polymerisation reaction begins at low temperatures. For instance, a peak-temperature is observed at 133.8° C. for Example 1.22. This finding applies equally to the gel times, which shorten as the proportion of accelerator increases. The activity towards an epoxy resin-curing agent mixture may also be controlled by the nature of substitution of the semicarbazones (I). By way of example, 1.20-1.22 may be compared with 1.35-1.37. A strong effect on catalytic action is also illustrated by comparing 1.20-1.22 with 1.38-1.40, when the residues $R^1$ and $R^2$ are varied.

These may be compared with commercially available accelerators which have long been on the market, such as for example Dyhard UR500 or Dyhard PI-FF (Examples 1.01-1.06). Similarly, structural, chemical differences as well as the proportion used have an effect on the accelerating action in an epoxy resin-curing agent mixture.

Example 2

Latency at 25° C.

The resin formulations of the general composition Epikote 828 (100 parts):DCD (6.5 parts):accelerator (x parts) were prepared and tested as described above in accordance with Tables 2a and 2b.

TABLE 2a

Latency at 25° C. in hours (h) or days (d) (not according to the invention)

| Composition | Accelerator (parts) | Percentage increase in viscosity as a measure of latency | | | |
|---|---|---|---|---|---|
| | | 20% | 50% | 100% | 300% |
| 1.01 | UR500 (1.0 part) | 44 d | 57 d | 65 d | 80 d |
| 1.02 | UR500 (3.0 parts) | 36 d | 48 d | 58 d | 71 d |
| 1.03 | UR500 (5.0 parts) | 22 d | 43 d | 54 d | 62 d |
| 1.04 | PI-FF (1.0 part) | 14 h = 0.58 d | 28 h = 1.17 d | 68 h = 2.83 d | 90 h = 3.75 d |
| 1.05 | PI-FF (3.0 parts) | 17 h = 0.71 d | 19 h = 0.79 d | 21 h = 0.88 d | 27 h = 1.13 d |

TABLE 2b

Latency at 25° C. in hours (h) or days (d) (according to the invention)

| Composition | Accelerator (parts) | Percentage increase in viscosity as a measure of latency | | | |
|---|---|---|---|---|---|
| | | 20% | 50% | 100% | 300% |
| 1.20 | Ac DMS (1.0 part) | 16 d | 26 d | 34 d | 46 d |
| 1.21 | Ac DMS (3.0 parts) | 6 d | 12 d | 17 d | 26 d |
| 1.22 | Ac DMS (5.0 parts) | 4 d | 7 d | 11 d | 20 d |
| 1.23 | MEK DMS (1.0 part) | 23 d | 32 d | 40 d | 54 d |
| 1.24 | MEK DMS (3.0 parts) | 15 d | 22 d | 28 d | 38 d |
| 1.25 | MEK DMS (5.0 parts) | 6 d | 12 d | 19 d | 32 d |
| 1.26 | MIBK DMS (1.0 part) | 18 d | 31 d | 46 d | 66 d |
| 1.27 | MIBK DMS (3.0 parts) | 14 d | 21 d | 29 d | 46 d |
| 1.28 | MIBK DMS (5.0 parts) | 5 d | 9 d | 17 d | 29 d |
| 1.29 | CyPn DMS (1.0 part) | 32 d | 66 d | 115 d | >140 d |
| 1.30 | CyPn DMS (3.0 parts) | 38 d | 71 d | 111 d | >140 d |
| 1.31 | CyPn DMS (5.0 parts) | 10 d | 26 d | 60 d | >140 d |
| 1.32 | CyHx DMS (1.0 part) | 40 d | 100 d | >150 d | — |
| 1.33 | CyHx DMS (3.0 parts) | 14 d | 60 d | 110 d | >150 d |
| 1.34 | CyHx DMS (5.0 parts) | 10 d | 20 d | 42 d | 103 d |
| 1.35 | AcPh DMS (1.0 part) | 30 d | 70 d | 120 d | >150 d |
| 1.36 | AcPh DMS (3.0 parts) | 18 d | 33 d | 48 d | 72 d |
| 1.37 | AcPh DMS (5.0 parts) | 3 d | 9 d | 17 d | 35 d |
| 1.38 | Ac DES (1.0 part) | 8 d | 20 d | 30 d | 37 d |
| 1.39 | Ac DES (3.0 parts) | 6 d | 14 d | 18 d | 25 d |
| 1.40 | Ac DES (5.0 parts) | 4 d | 9 d | 13 d | 16 d |
| 1.41 | AcPh DES (1.0 part) | 38 d | 63 d | 91 d | >150 d |
| 1.42 | AcPh DES (3.0 parts) | 13 d | 44 d | 57 d | 80 d |
| 1.43 | AcPh DES (5.0 parts) | 5 d | 22 d | 44 d | 62 d |

According to Examples 1.20 to 1.43, the accelerators (I) according to the invention are more latent in the tested resin formulation than the uron comparisons 1.01 to 1.03, but substantially more latent than the imidazole derivatives of Examples 1.04 to 1.05.

Example 3

Latency at 60° C.

The resin formulations of the general composition Epikote 828 (100 parts):DCD (6.5 parts):accelerator (x parts) were prepared and tested as described above in accordance with Tables 3a and 3b.

TABLE 3a

Latency at 60° C. in hours (h) (not according to the invention)

| Composition | Accelerator (parts) | Percentage increase in viscosity as a measure of latency | | | |
|---|---|---|---|---|---|
| | | 20% | 50% | 100% | 300% |
| 1.01 | UR500 (1.0 part) | 6.75 h | 9.0 h | 10.75 h | 13.5 h |
| 1.02 | UR500 (3.0 parts) | 4.0 h | 6.75 h | 8.75 h | 12.0 h |
| 1.04 | PI-FF (1.0 part) | 2.25 h | 3.0 h | 3.0 h | 4.5 h |

TABLE 3b

Latency at 60° C. in hours (h) (according to the invention)

| Composition | Accelerator (parts) | Percentage increase in viscosity as a measure of latency | | | |
|---|---|---|---|---|---|
| | | 20% | 50% | 100% | 300% |
| 1.20 | Ac DMS (1.0 part) | 3.0 h | 5.0 h | 6.5 h | 9.0 h |
| 1.21 | Ac DMS (3.0 parts) | 1.5 h | 2.5 h | 3.5 h | 5.0 h |
| 1.23 | MEK DMS (1.0 part) | 3.5 h | 5.5 h | 7.0 h | 9.5 h |
| 1.24 | MEK DMS (3.0 parts) | 2.0 h | 2.75 h | 3.5 h | 4.5 h |
| 1.26 | MIBK DMS (1.0 part) | 4.5 h | 6.0 h | 7.25 h | 9.25 h |
| 1.27 | MIBK DMS (3.0 parts) | 3.5 h | 4.5 h | 5.0 h | 6.0 h |

TABLE 3b-continued

Latency at 60° C. in hours (h) (according to the invention)

| Composition | Accelerator (parts) | Percentage increase in viscosity as a measure of latency | | | |
|---|---|---|---|---|---|
| | | 20% | 50% | 100% | 300% |
| 1.29 | CyPn DMS (1.0 part) | 6.5 h | 9.0 h | 11.0 h | 15.0 h |
| 1.30 | CyPn DMS (3.0 parts) | 1.0 h | 2.0 h | 4.5 h | 9.25 h |
| 1.32 | AcPh DMS (1.0 part) | 6.5 h | 9.0 h | 11.0 h | 14.0 h |
| 1.33 | AcPh DMS (3.0 parts) | 2.0 h | 4.5 h | 6.5 h | 9.5 h |
| 1.34 | AcPh DMS (5.0 parts) | 1.0 h | 2.5 h | 4.0 h | 6.5 h |

According to Examples 1.20 to 1.34, the accelerators (I) according to the invention are better in the test resin formulation than the uron comparison Dyhard 500 (Examples 1.01-1.03). In comparison with the imidazole derivative (Example 1.07), the new semicarbazones (I) are substantially more latent (Examples 1.20-1.34).

The invention claimed is:
1. An epoxy resin composition comprising:
a) an epoxy resin with at least one reactive epoxy group;
b) at least one heat-activatable curing agent; and,
c) a curing accelerator comprising at least one semicarbazone of the general formula (I),

Formula (I)

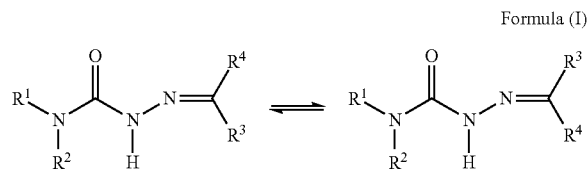

R$^1$=branched or linear alkyl residue, cycloalkyl residue, aryl residue or alkyl aryl residue,
R$^2$=H, branched or linear alkyl residue, cycloalkyl residue, aryl residue or alkylaryl residue, and
R$^3$, R$^4$=simultaneously or mutually independently H, branched or linear alkyl residue, cycloalkyl residue, alkylaryl residue, aryl residue, heteroaryl residue or CN;
or
R$^1$=branched or linear alkyl residue, cycloalkyl residue, aryl residue or alkylaryl residue,
R$^2$=H, branched or linear alkyl residue, cycloalkyl residue, aryl residue or alkylaryl residue, and
R$^3$ and R$^4$=alkylene with —(CH$_2$)$_n$— and 2≤n≤11.
2. The epoxy resin composition of claim 1, wherein
R$^1$=methyl, ethyl, benzyl or phenyl,
R$^2$=H, methyl, ethyl, benzyl or phenyl, and
R$^3$, R$^4$=simultaneously or mutually independently H, methyl, ethyl, propyl, isopropyl, butyl, isobutyl, benzyl or phenyl,
or
R$^1$=methyl, ethyl, benzyl or phenyl,
R$^2$=H, methyl, ethyl, benzyl or phenyl, and
R$^3$ and R$^4$=alkylene with —(CH$_2$)$_n$— and 2≤n≤6.
3. The epoxy resin composition of claim 1, wherein the epoxy resin is selected from the group consisting of glycidyl polyethers of 2,2-bis(4-hydroxyphenyl)propane (bisphenol A), glycidyl polyethers of bromine-substituted derivative of 2,2-bis(4-hydroxyphenyl)propane (tetrabromobisphenol A), glycidyl polyethers of 2,2-bis(4-hydroxyphenyl)methane (bisphenol F), glycidyl polyethers of novolak resins, glycidyl polyethers of aniline, glycidyl polyethers of substituted anilines, glycidyl polyethers of p-aminophenol and glycidyl polyethers of 4,4'-diaminodiphenylmethane.

4. The epoxy resin composition of claim 2, wherein the epoxy resin is selected from the group consisting of glycidyl polyethers of 2,2-bis(4-hydroxyphenyl)propane (bisphenol A), glycidyl polyethers of bromine-substituted derivative of 2,2-bis(4-hydroxyphenyl)propane (tetrabromobisphenol A), glycidyl polyethers of 2,2-bis(4-hydroxyphenyl)methane (bisphenol F), glycidyl polyethers of novolak resins, glycidyl polyethers of aniline, glycidyl polyethers of substituted anilines, preferably glycidyl polyethers of p-aminophenol and glycidyl polyethers of 4,4'-diaminodiphenylmethane.

5. The epoxy resin composition of claim 1, wherein the at least one heat-activatable curing agent is selected from the group consisting of biguanides, ortho-tolylbiguanide (OTB), methylenedianiline (MDA, DDM), para-aminocyclohexylmethane (PACM), 3,3'-diaminodiphenyl sulfone (DDS), 4,4'-diaminodiphenyl sulfone (DDS) polyetheramines, dicyandiamide (DCD), dihydrazides of adipic acid dihydrazides of sebacic acid, anhydrides of pyromellitic acid, anhydrides of trimellitic acid, anhydrides of phthalic acid, phenol novolaks, cresol novolaks, and mixtures thereof.

6. The epoxy resin composition of claim 2, wherein the at least one heat-activatable curing agent is selected from the group consisting of biguanides, ortho-tolylbiguanide (OTB), methylenedianiline (MDA, DDM), para-aminocyclohexylmethane (PACM), 3,3'-diaminodiphenyl sulfone (DDS), 4,4'-diaminodiphenyl sulfone (DDS) polyetheramines, dicyandiamide (DCD), dihydrazides of adipic acid dihydrazides of sebacic acid, anhydrides of pyromellitic acid, anhydrides of trimellitic acid, anhydrides of phthalic acid, phenol novolaks, cresol novolaks, and mixtures thereof.

7. The epoxy resin composition of claim 3, wherein the at least one heat-activatable curing agent is selected from the group consisting of biguanides, ortho-tolylbiguanide (OTB), methylenedianiline (MDA, DDM), para-aminocyclohexylmethane (PACM), 3,3'-diaminodiphenyl sulfone (DDS), 4,4'-diaminodiphenyl sulfone (DDS) polyetheramines, dicyandiamide (DCD), dihydrazides of adipic acid dihydrazides of sebacic acid, anhydrides of pyromellitic acid, anhydrides of trimellitic acid, anhydrides of phthalic acid, phenol novolaks, cresol novolaks, and mixtures thereof.

8. The epoxy resin composition of claim 4, wherein the at least one heat-activatable curing agent is selected from the group consisting of biguanides, ortho-tolylbiguanide (OTB), methylenedianiline (MDA, DDM), para-aminocyclohexylmethane (PACM), 3,3'-diaminodiphenyl sulfone (DDS), 4,4'-diaminodiphenyl sulfone (DDS) polyetheramines, dicyandiamide (DCD), dihydrazides of adipic acid dihydrazides of sebacic acid, anhydrides of pyromellitic acid, anhydrides of trimellitic acid, anhydrides of phthalic acid, phenol novolaks, cresol novolaks, and mixtures thereof.

9. A method for curing epoxy resin compositions comprising:
mixing a heat-activatable curing agent with an epoxy resin composition to form a mixture; and,
adding at least one semicarbazone to the mixture, wherein the at least one semicarbazone is of the general formula (I)

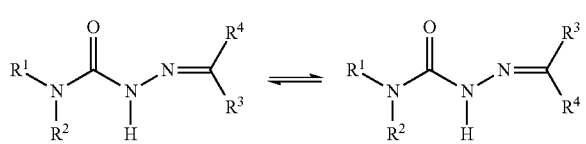

Formula (I)

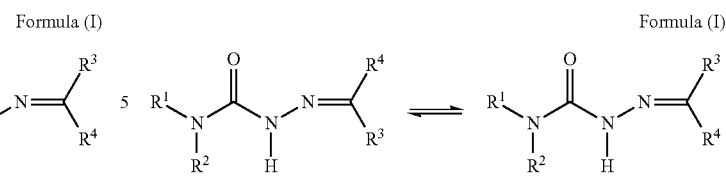

Formula (I)

wherein
$R^1$=branched or linear alkyl residue, cycloalkyl residue, aryl residue or alkyl aryl residue,
$R^2$=H, branched or linear alkyl residue, cycloalkyl residue, aryl residue or alkylaryl residue, and
$R^3$, $R^4$=simultaneously or mutually independently H, branched or linear alkyl residue, cycloalkyl residue, alkylaryl residue, aryl residue, heteroaryl residue or CN;
or
$R^1$=branched or linear alkyl residue, cycloalkyl residue, aryl residue or alkylaryl residue, and
$R^2$=H, branched or linear alkyl residue, cycloalkyl residue, aryl residue or alkyl aryl residue,
$R^3$ and $R^4$=alkylene with —$(CH_2)_n$— and $2 \le n \le 11$.

10. The method of claim 9, wherein the heat-activatable curing agent is selected from the group consisting of amines, amides, guanidines, biguanides, carboxylic anhydrides and polyphenols.

11. The method of claim 9, wherein the heat-activatable curing agent is dicyandiamide.

12. The method of claim 9, wherein the at least one semicarbazone or mixtures of semicarbazones are used in a quantity of 0.1 to 15 wt. % relative to the epoxy resin composition.

13. The method of claim 10, wherein the at least one semicarbazone or mixtures of semicarbazones are used in a quantity of 0.1 to 15 wt. % relative to the epoxy resin composition.

14. The method of claim 11, wherein the at least one semicarbazone or mixtures of semicarbazones are used in a quantity of 0.1 to 15 wt. % relative to the epoxy resin composition.

15. The method of claim 9, wherein the at least one semicarbazone or mixtures of semicarbazones are used in a ratio of 0.1 to 15 parts, relative to 100 parts of the epoxy resin composition.

16. The method of claim 10, wherein the at least one semicarbazone or mixtures of semicarbazones are used in a ratio of 0.1 to 15 parts, relative to 100 parts of the epoxy resin composition.

17. The method of claim 11, wherein the at least one semicarbazone or mixtures of semicarbazones are used in a ratio of 0.1 to 15 parts, relative to 100 parts of the epoxy resin composition.

18. The method of claim 9, further comprising supplying energy to the mixture.

19. The method of claim 18, wherein the energy is supplied in form of heat.

20. A curing composition for curing epoxy resin compositions, comprising
a heat-activatable curing agent and
a curing accelerator comprising a semicarbazone of formula (I)

$R^1$=branched or linear alkyl residue, cycloalkyl residue, aryl residue or alkylaryl residue,
$R^2$=H, branched or linear alkyl residue, cycloalkyl residue, aryl residue or alkylaryl residue, and
$R^3$, $R^4$=simultaneously or mutually independently H, branched or linear alkyl residue, cycloalkyl residue, alkylaryl residue, aryl residue, heteroaryl residue or CN;
or
$R^1$=branched or linear alkyl residue, cycloalkyl residue, aryl residue or alkylaryl residue,
$R^2$=H, branched or linear alkyl residue, cycloalkyl residue, aryl residue or alkylaryl residue, and
$R^3$ and $R^4$=alkylene with —$(CH_2)_n$— and $2 \le n \le 11$.

21. The curing composition of claim 20 comprising a semicarbazone of formula (I)

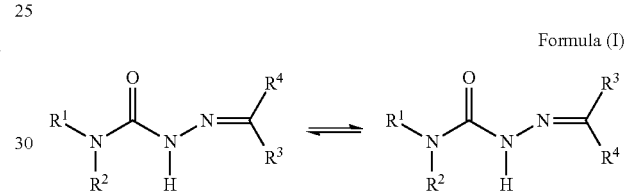

Formula (I)

wherein
$R^1$=methyl, ethyl, benzyl or phenyl,
$R^2$=H, methyl, ethyl, benzyl or phenyl, and
$R^3$, $R^4$=simultaneously or mutually independently H, methyl, ethyl, propyl, isopropyl, butyl, isobutyl, benzyl or phenyl,
or
$R^1$=methyl, ethyl, benzyl or phenyl,
$R^2$=H, methyl, ethyl, benzyl or phenyl, and
$R^3$ and $R^4$=alkylene with —$(CH_2)_n$— and $2 \le n \le 6$.

22. The curing composition of claim 20, wherein the semicarbazone is acetone 4,4-dimethyl semicarbazone, methyl ethyl ketone 4,4-dimethyl semicarbazone, dicyclopropyl ketone 4,4-dimethyl semicarbazone, methyl isobutyl ketone 4,4-dimethyl semi-carbazone, cyclopentanone 4,4-dimethyl semicarbazone, cyclohexanone 4,4-dimethyl semicarbazone, acetophenone 4,4-dimethyl semicarbazone, cyclopropyl phenyl ketone 4,4-dimethylsemicarbazone, benzophenone 4,4-dimethylsemicarbazone, acetone 4,4-diethyl semicarbazone, cyclopentanone 4,4-diethyl semicarbazone or acetophenone 4,4-diethyl-semicarbazone.

23. The curing composition of claim 20, wherein the heat-activatable curing agent is selected from the group consisting of amines, amides, guanidines, biguanides, carboxylic anhydrides and polyphenols.

24. The curing composition of claim 20, wherein the heat-activatable curing agent is dicyandiamide.

* * * * *